(12) United States Patent
Lee et al.

(10) Patent No.: US 11,615,287 B2
(45) Date of Patent: Mar. 28, 2023

(54) PROCESSING COMPUTATIONAL MODELS IN PARALLEL

(71) Applicant: LG ELECTRONICS INC., Seoul (KR)

(72) Inventors: Byoungjoo Lee, Seoul (KR); Jemin Woo, Pyeongtaek-si (KR); Jinjong Lee, Seoul (KR); Jungsig Jun, Bucheon-si (KR)

(73) Assignee: LG ELECTRONICS INC., Seoul (KR)

( * ) Notice: Subject to any disclaimer, the term of this patent is extended or adjusted under 35 U.S.C. 154(b) by 369 days.

(21) Appl. No.: 16/777,729

(22) Filed: Jan. 30, 2020

(65) Prior Publication Data

US 2020/0250509 A1    Aug. 6, 2020

Related U.S. Application Data

(60) Provisional application No. 62/799,797, filed on Feb. 1, 2019.

(30) Foreign Application Priority Data

Dec. 10, 2019  (KR) .................. 10-2019-0163982

(51) Int. Cl.
*G06N 3/04* (2006.01)
*G06N 3/10* (2006.01)
*G06N 3/08* (2023.01)

(52) U.S. Cl.
CPC ............... *G06N 3/04* (2013.01); *G06N 3/08* (2013.01); *G06N 3/10* (2013.01)

(58) Field of Classification Search
CPC .. G06N 3/04; G06N 3/08; G06N 3/10; G06N 3/063
See application file for complete search history.

(56) References Cited

U.S. PATENT DOCUMENTS

| 8,370,495 B2 | 2/2013 | Jackson |
| 9,396,023 B1 | 7/2016 | Trivedi |

(Continued)

FOREIGN PATENT DOCUMENTS

| WO | 2005111843 | 11/2005 |
| WO | 2016048345 | 3/2016 |

OTHER PUBLICATIONS

PCT International Application No. PCT/KR2020/001449, International Search Report dated May 12, 2020, 3 pages.

(Continued)

*Primary Examiner* — Kyoung Lee
(74) *Attorney, Agent, or Firm* — Lee, Hong, Degerman, Kang & Waimey PC

(57) ABSTRACT

The present disclosure relates to an artificial intelligence chip for processing computations for machine learning models that provides a compute node and a method of processing a computational model using a plurality of compute nodes in parallel. In some embodiments, the compute node, comprises: a communication interface configured to communicate with one or more other compute nodes; a memory configured to store shared data that is shared with the one or more other compute nodes; and a processor configured to: determine an expected computational load for processing a computational model for input data; obtain a contributable computational load of the compute node and the one or more other compute nodes; and select a master node to distribute the determined expected computational load based on the obtained contributable computational load. Consequently, learning and inference can be performed efficiently on-device.

20 Claims, 9 Drawing Sheets

(56) References Cited

U.S. PATENT DOCUMENTS

| | | | |
|---|---|---|---|
| 2009/0132541 A1* | 5/2009 | Barsness | G06F 16/24532 707/E17.14 |
| 2011/0191782 A1 | 8/2011 | Kim et al. | |
| 2014/0201758 A1 | 7/2014 | Albornoz et al. | |
| 2015/0078126 A1 | 3/2015 | Lu | |
| 2017/0048731 A1 | 2/2017 | Gibson et al. | |

OTHER PUBLICATIONS

European Patent Office Application Serial No. 20749721.5, Extended Search Report dated Jul. 7, 2022, 14 pages.
Haddadpouret al., "Straggler-Resilient and Communication-Efficient Distributed Iterative Linear Solver," Arxiv.org, Cornell University Library, arXiv.1806.06140v1, Jun. 2018, 15 pages.
Li et al., "Near-Optimal Straggler Mitigation for Distributed Gradient Methods," Arxiv.org, Cornell University Library, arXiv.1710.09990v1, Oct. 2017, 10 pages.

* cited by examiner

FIG. 9

| | 910 |
|---|---|
| BROADCAST_CANDIDATE_REQUEST | <Input data, Task ID, Model information, Computational constraint > |
| BROADCAST_CANDIDATE_RESPONSE | <Task ID, Compute Node ID, Contributable computational load> |
| BROADCAST_MASTER_DESIGNATE | <Task ID, Master Node> |
| MULTICAST_CHANNEL_SETUP | <Task ID, Multicast channel information> |
| MULTICAST_DATA_SHARE | <Multicast channel ID, Intermediate data> |
| MULTICAST_RESULT_SHARE | <Multicast channel ID, Computing result> |
| UNICAST_RESULT_REPORT | <Task ID, Computing result> |

FIG. 10

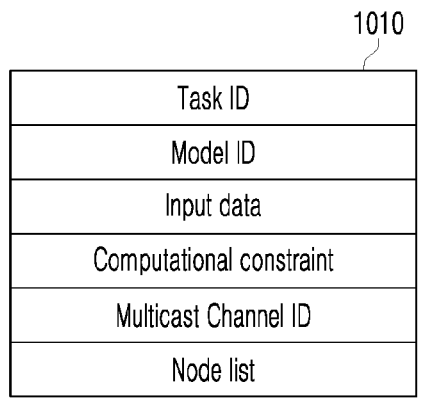

PROCESSING COMPUTATIONAL MODELS IN PARALLEL

CROSS-REFERENCE TO RELATED APPLICATION

Pursuant to 35 U.S.C. § 119, this application claims the benefit of earlier filing date and right of priority to Korean Application No. 10-2019-0163982, filed on Dec. 10, 2019, and also claims the benefit of U.S. Provisional Application Ser. No. 62/799,797, filed on Feb. 1, 2019 the contents of which are all hereby incorporated by reference herein in their entirety.

BACKGROUND

1. Technical Field

The present disclosure relates to a compute node and a method of processing a computational model using a plurality of compute nodes in parallel.

2. Description of Related Art

With the commercialization of artificial intelligence technologies, various products and services that use artificial neural networks are being developed.

Meanwhile, the importance of technology for performing artificial intelligence computation in an edge device without being connected to a server is increasingly important in terms of network traffic, energy efficiency, and privacy protection.

As such, there is a need for an artificial intelligence chip which can efficiently compute an artificial neural network algorithm on-device.

SUMMARY OF THE INVENTION

An aspect of the present disclosure is to provide a compute node with multiple expandable structures as a compute node for performing artificial neural network computation.

Another aspect of the present disclosure is to provide a computational model processing method by a plurality of compute nodes.

Still another aspect of the present disclosure is to provide an artificial intelligence chip which computes an artificial neural network algorithm on a device.

Aspects of the present disclosure are not limited to the above-mentioned aspects, and other technical aspects not mentioned above will be clearly understood by those skilled in the art from the following description.

An aspect of an embodiment of the present disclosure provides a compute node which is capable of symmetrically expanding a plurality of compute nodes through a high speed communication interface.

To this end, the compute node includes a communication interface configured to communicate with one or more other compute nodes, a memory which stores shared data to be shared with the other compute nodes, and a processor.

Specifically, the processor may be configured to determine an expected computational load for processing a computational model for input data, obtain information of a contributable computational load of the compute node and the other compute nodes; and select a master node to distribute the expected computational load based on the obtained information of the contributable computational load.

Another aspect of an embodiment of the present disclosure provides a computational model processing method which is capable of processing at least one computational model by a plurality of compute nodes in parallel.

To this end, a computational model processing method by a plurality of compute nodes includes receiving input data by a home node, wherein the home node is one of a plurality of compute nodes, determining, by the home node, an expected computational load for processing a computational model for the input data, transmitting, by each compute node, information of a contributable computational load in response to a request of the home node, and selecting, by the home node, a master node configured to distribute the determined expected computational load among the plurality of compute nodes based on the transmitted information of the contributable computational load.

Another aspect of an embodiment of the present disclosure provides an artificial intelligence chip including a compute node which is capable of computing a computational model which implements various artificial intelligence network algorithms.

To this end, the compute node may include at least one AI accelerator.

Specifically, the AI accelerator may be configured to generate intermediate data while performing the computation and store the intermediate data in the memory.

Specifically, the AI accelerator may distribute the intermediate data with the other compute nodes through the communication interface.

Other embodiments, aspects, and features in addition those described above will become clear from the accompanying drawings, claims, and the detailed description of the present disclosure.

According to the present disclosure, input data can be analyzed using multiple computational models in a plurality of compute nodes in parallel, such that accuracy is improved.

According to the present disclosure, the computational model is computed by the plurality of compute nodes, such that a computing speed and a response time are improved.

According to the present disclosure, learning and inference are performed on-device such that applicability to products requiring privacy protection is improved.

The effects of the present disclosure are not limited to those mentioned above, and other effects not mentioned may be clearly understood by those skilled in the art from the following description.

BRIEF DESCRIPTION OF DRAWINGS

The above and other aspects, features, and advantages of the present disclosure will become apparent from the detailed description of the following aspects in conjunction with the accompanying drawings, in which:

FIG. 9 is a table exemplarily illustrating a message structure of a computational model processing process according to an embodiment of the present disclosure; and FIG. 10 is a table exemplarily illustrating a structure of a task table according to an embodiment of the present disclosure.

DETAILED DESCRIPTION

Figure 1:
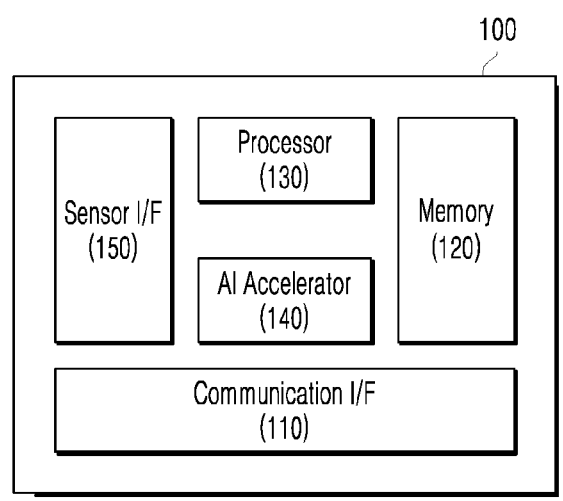
FIG. 1 is a block diagram of a compute node according to an embodiment of the present disclosure.

Hereinafter, an embodiment disclosed herein will be described in detail with reference to the accompanying drawings, and the same reference numerals are given to the same or similar components and duplicate descriptions thereof will be omitted. In addition, in describing an embodiment disclosed in the present document, if it is determined that a detailed description of a related art incorporated herein unnecessarily obscure the gist of the embodiment, the detailed description thereof will be omitted.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Prior to the description of embodiments, an artificial intelligence technology will be described.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and optionally one or more hidden layers. Each layer includes one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training the ANN with training data that has been given a label. In addition, the label may refer to a target answer (or a result value) to be inferred by the ANN when the training data is inputted to the ANN. Unsupervised learning may refer to a method for training an ANN using training data that has not been given a label. Reinforcement learning may refer to a learning method for training an agent defined within an environment to select an action or an action order for maximizing cumulative rewards in each state.

Machine learning of an ANN implemented as a deep neural network (DNN) including a plurality of hidden layers may be referred to as deep learning, and the deep learning is one machine learning technique. Hereinafter, the meaning of machine learning includes deep learning.

FIG. 1 is a block diagram of a compute node according to an embodiment of the present disclosure.

A compute node 100 refers to a hardware component implemented to learn and infer input data based on a computational model.

A computational model refers to a neural network model for performing learning and/or inference based on machine learning. The computational model is a software library which implements a neural network for machine learning, and may be provided as a type of application programming interface (API). The computational model may be executed in an AI accelerator 140 to be described below.

The computational model may include various neural network models for performing learning/inference computations. For example, the computational model may include a software library which implements LeNet, SACNet, SqueezeNet, RK-imageNet, AlexNet, PVANet-lite, SegNet, VGG16, GoogleNet, ResNet-50, MobileNet, ERFNet, PQNet (TensorFlow), and the like.

The compute node 100 simultaneously and/or sequentially executes one or more computational models, and outputs an optimal result with respect to input data by comparing the results. In one embodiment, the compute node 100 may be implemented as a system on chip (SoC).

The compute node 100 may include a communication interface 110, a memory 120, a processor 130, an AI accelerator 140, and a sensor interface 150. The components illustrated in FIG. 1 are not essential to implement the compute node 100, and the compute node 100 according to the embodiment may include some of the components mentioned above or may include additional components in addition to the above-mentioned components.

The compute node 100 may include a communication interface 110 configured to communicate with one or more other compute nodes, a memory 120 which stores shared data to be distributed with other compute nodes, and a processor 130 connected to the memory 120.

The communication interface 110 provides interconnection between the compute nodes 100.

The communication interface 110 may include hardware components such as a communication controller (for example, a Universal Serial Bus (USB) Hub IC, a USB to Ethernet PHYceiver, an Ethernet Controller, an Ethernet Switch Controller, and a serial peripheral interface (SPI) to Ethernet Controller) which controls communication between the compute nodes 100, and a transceiver or a transmitter and a receiver for transmitting and receiving data in accordance with a communication method between the compute nodes 100.

The communication interface 110 may include a software component such as a library which implements a protocol stack in accordance with a communication protocol between the compute nodes 100.

In one embodiment, the communication interface 110 may be implemented by at least one communication method of USB, Ethernet, or serial peripheral interface (SPI), but is not limited thereto. In other words, the communication interface 110 may be implemented using various types of high speed communication interfaces.

The memory 120 may store shared data to be shared (or distributed) with the other compute nodes 100 by the compute node 100. For example, the shared data may include input data, a contributable computational load of each compute node 100, intermediate data acquired by executing a computational model, and a computing result of the computational model.

The memory 120 may include an internal memory and/or an external memory and may include a volatile memory such as a dynamic random access memory (DRAM), a static random access memory (SRAM) or a synchronous dynamic random access memory (SDRAM), and a non-volatile memory such as one time programmable read-only memory (ROM) (one-time programmable read-only memory (OTPROM)), a programmable read-only memory (PROM), an erasable programmable read-only memory (EPROM), an electrically erasable programmable read-only memory (EEPROM), a mask ROM, a flash ROM, a NAND flash memory or a NOR flash memory, a flash drive such as an SSD, a compact flash (CF) card, a secure digital (SD) card, a Micro-SD card, a Mini-SD card, an extreme digital (XD) card or memory stick, or a storage device such as a hard disc drive (HDD). The memory 120 may include, but is not limited to, magnetic storage media or flash storage media.

The memory 120 may provide instructions executable by the processor 130. When executed by the processor 130, the instructions cause the processor 130 to determine an expected computational load for processing the computational model for the input data, cause the compute node 100 and the other compute nodes 100 to share (or obtain) a contributable computational load through the communication interface 110, and select a master node to distribute the expected computational load based on the contributable computational load.

The processor 130 is a type of central processing unit, and controls an operation of the compute node 100 by running control software loaded in the memory 120. The processor 130 may include all kinds of devices capable of processing data. Here, the processor 130 may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), a field programmable gate array (FPGA), and the like may be included, but the scope of the present disclosure is not limited thereto. The processor 130 may include one or more processors.

The processor 130 may be configured to determine an expected computational load for processing the computational model for the input data, cause the compute node 100 and the other compute nodes 100 to share (or obtain) a contributable computational load through the communication interface 110, and determine a master node to distribute the expected computational load based on the contributable computational load.

The compute node 100 may include a sensor interface 150 for connection with an external sensor. The processor 130 may be configured to receive input data from the external sensor through the sensor interface 150.

The external sensor may include one or more sensors. For example, the external sensor may include an image sensor, a proximity sensor, an illuminance sensor, an accelerator sensor, a magnetic sensor, a gyro sensor, an inertial sensor, a red green blue (RGB) sensor, a infrared (IR) sensor, a fingerprint sensor, an ultrasonic sensor, an optical sensor, a microphone, a light detection and ranging (LIDAR), and a radar.

The compute node 100 may include at least one AI accelerator 140 configured to perform the computation of the computational model.

The AI accelerator 140 refers to a hardware component which sequentially or simultaneously computes at least one computational model allocated to the compute node 100. The AI accelerator 140 may include at least one processor and a memory shared by the at least one processor.

The AI accelerator 140 generates intermediate data while performing the computation of the computational model, and stores the generated intermediate data in the memory 120. Further, the AI accelerator 140 may store a computing result of the computational model in the memory 120. The processor 130 may be configured to distribute the intermediate data and the computing result with the other compute nodes 100 through the communication interface 110.

Figure 2:
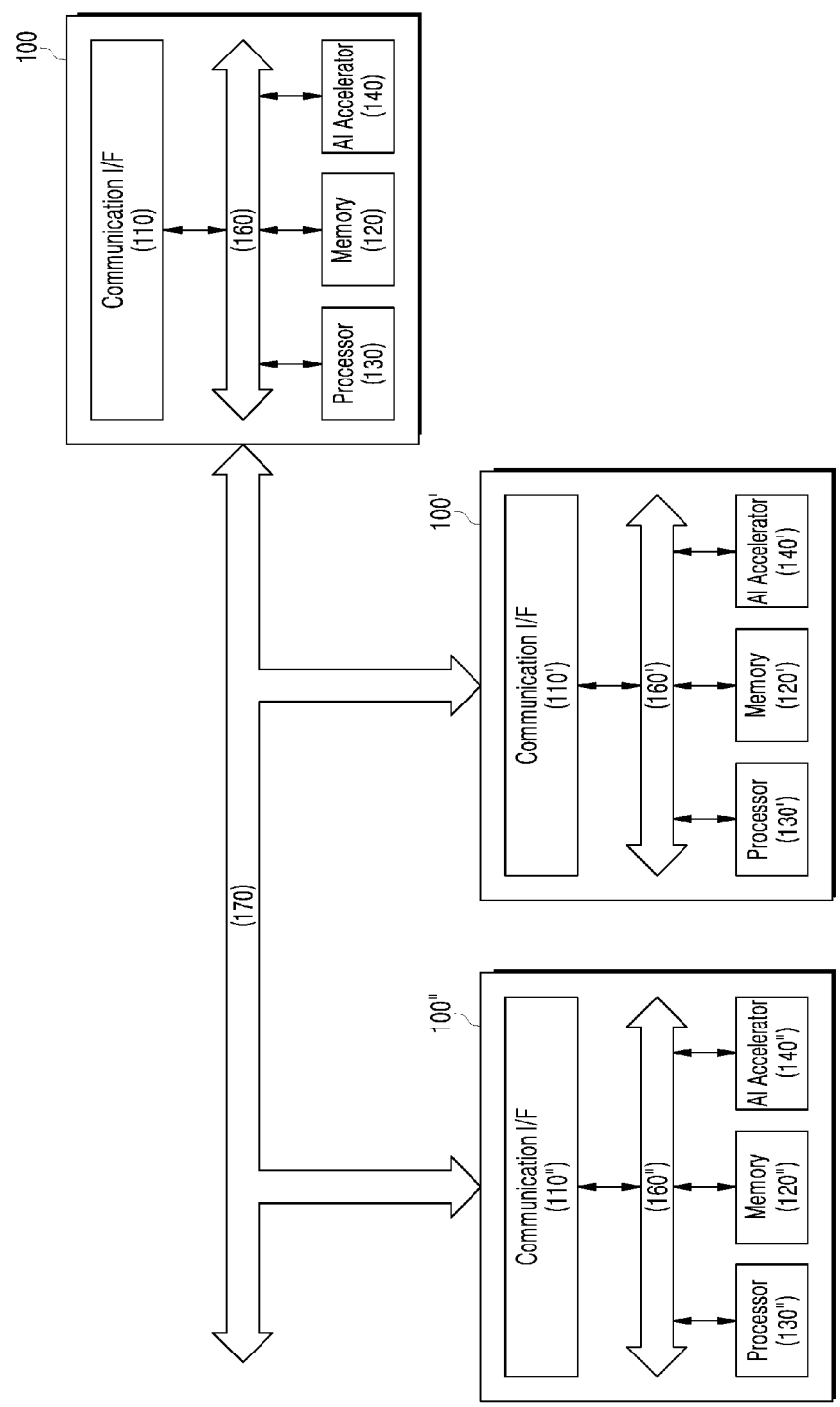
FIG. 2 is a block diagram of a plurality of compute nodes interconnected to each other according to an embodiment of the present disclosure.

FIG. 2 is a block diagram of a plurality of compute nodes interconnected to each other according to an embodiment of the present disclosure.

The compute node 100 may include a bus interface 160 for on-chip communication. The bus interface 160 may provide interconnection between the processor 130, the memory 120, the AI accelerator 140, and the communication interface 110.

Being "interconnected" refers to a state in which a physical/logical path through which subjects are connected to each other is provided, such that a control signal and data can be transmitted and received therebetween.

The compute node 100 may be interconnected to one or more other compute nodes 100' and 100" through the communication interface 110.

When the compute nodes 100, 100', and 100" are interconnected, a physical/logical path 170 through which the compute nodes 100, 100', and 100" are connected to each other is provided such that messages can be exchanged between the compute nodes 100, 100', and 100". For example, a message may include control information and data. Each compute node 100, 100', and 100" controls the physical/logical path 170 through its own communication interface 110, 110', and 110", and transmits and receives data.

The physical/logical path 170 may provide at least one communication path of universal serial bus (USB), Ethernet, and serial peripheral interface (SPI) in accordance with a communication method provided by the communication interface 110, and may also provide a communication path for various types of high speed communication interfaces.

In FIG. 2, three compute nodes 100, 100', and 100" are illustrated, but the embodiment is not limited thereto, and two or more compute nodes 100 may be interconnected to each other through the communication interface 110. A plurality of interconnected compute nodes 100 forms a cluster. A cluster including a plurality of compute nodes 100 will be described below with reference to FIGS. 3A and 3B.

In one example, the plurality of compute nodes which configures the cluster may be disposed on one board.

In one embodiment, one compute node of the plurality of compute nodes that configure the cluster is disposed on a main board, and each of the remaining compute nodes are respectively disposed on one sub board from among a plurality of sub boards, and mounted in a slot of the main board.

Figure 3A:
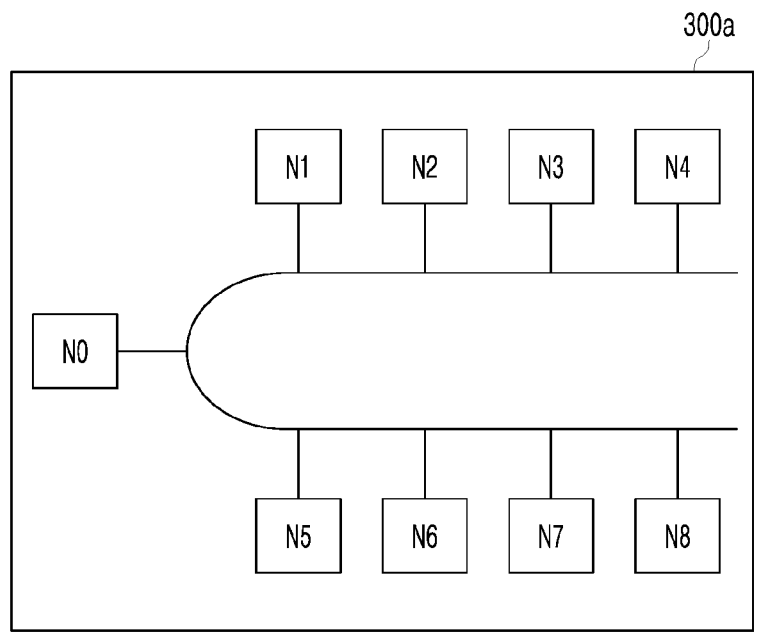
FIG. 3A is a view for explaining an operation of a plurality of compute nodes according to an embodiment of the present disclosure.

FIG. 3A is a view for explaining an operation of a plurality of compute nodes according to an embodiment of the present disclosure.

A cluster refers to a set of a plurality of interconnected compute nodes 100. The plurality of interconnected compute nodes 100 included in the cluster may perform a task together. For example, the task may include learning of input data based on a computational model or inference of a result value.

The cluster may include a plurality of compute nodes 100. An exemplary cluster 300a illustrated in FIG. 3A includes nine compute nodes $N_0$, $N_1$, $N_2$, $N_3$, $N_4$, $N_5$, $N_6$, $N_7$, and $N_8$. Each compute node $N_a$ (a is zero or a natural number) corresponds to one compute node 100 with reference to FIG. 1.

The cluster 300a may operate with a symmetric cluster structure. That is, each compute node $N_a$ of the plurality of compute nodes $N_0$, $N_1$, $N_2$, $N_3$, $N_4$, $N_5$, $N_6$, $N_7$, and $N_8$ that configure the cluster 300a may have the equal status. When each compute node $N_a$ has the equal status (e.g., each node within the cluster is identical and provides the same functionality), this means that each compute node $N_a$ may serve as a potential master node for any task.

In one example, the cluster 300a may determine a master node for each separate task. For example, the cluster 300a may determine the compute node $N_1$ as a master node for a first task and determine the compute node $N_2$ as a master node for a second task.

In one example, the cluster 300a may dynamically determine a master node for a task. For example, the cluster 300a may consider a current computational load of each compute node $N_a$ in order to determine a master node for a task.

The master node for a task determines at least one compute node to perform the task, distributes a sub task to the at least one determined compute node, and collects computing results. The sub task, which is a part of the task, refers to a partial computational load generated by dividing the entire computational load for performing the task into a plurality of computational loads.

Figure 3B:
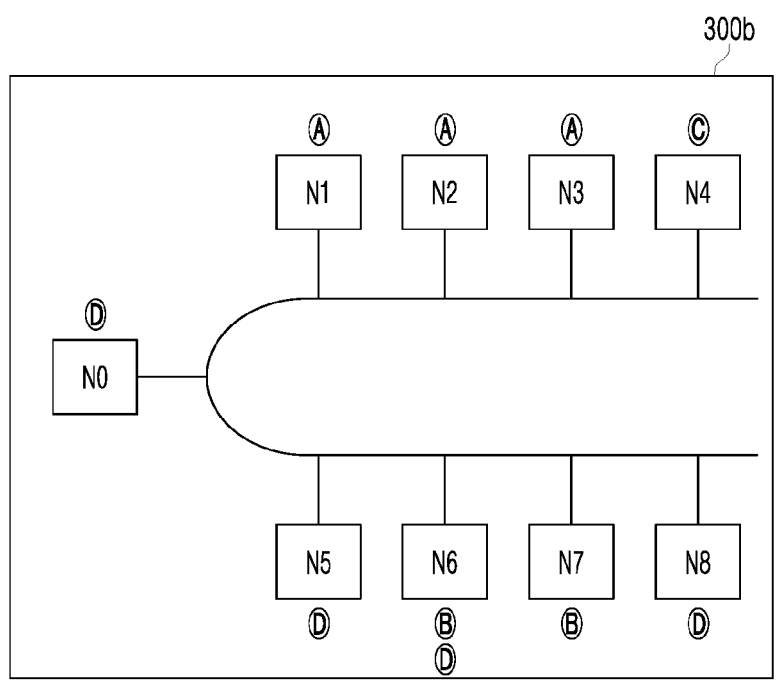
FIG. 3B is a view for explaining an operation of a plurality of compute nodes according to an embodiment of the present disclosure.

FIG. 3B is a view for explaining an operation of a plurality of compute nodes according to an embodiment of the present disclosure.

The cluster which includes a plurality of compute nodes may process at least one computational model. FIG. 3B illustrates a cluster 300b which processes four computational models (a computational model A, a computational model B, a computational model C, and a computational model D). An exemplary cluster 300b includes nine compute nodes $N_0$, $N_1$, $N_2$, $N_3$, $N_4$, $N_5$, $N_6$, $N_7$, and $N_8$.

The cluster 300b may process at least one computational model in parallel. For example, the compute nodes $N_1$, $N_2$, and $N_3$ process the computational model A, the compute nodes $N_6$ and $N_7$ process the computational model B, the compute node $N_4$ processes the computational model C, and the compute nodes $N_0$, $N_5$, $N_6$ and $N_8$ process the computational model D.

Each compute node $N_a$ sequentially or simultaneously processes at least one computational model. For example, the compute node $N_6$ may sequentially process the computational model D after completing the processing of the computational model B. As another example, the compute node $N_6$ may process the computational models B and D in parallel.

Hereinafter, an operation of the cluster will be described in detail with reference to FIGS. 6, 7A, and 7B.

Figure 6:
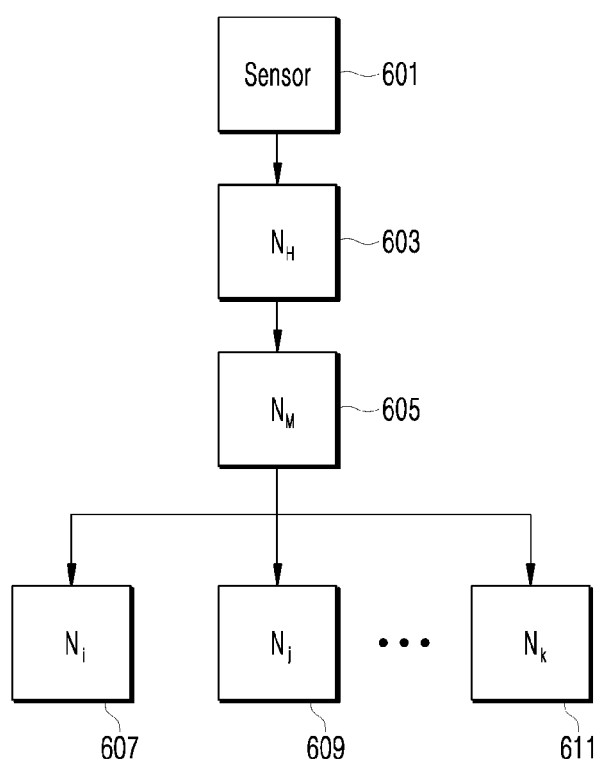
FIG. 6 is a view for explaining a computational model processing operation of a cluster according to an embodiment of the present disclosure.

FIG. 6 is a view for explaining a computational model processing operation of a cluster according to an embodiment of the present disclosure.

Referring to FIG. 1, the compute node 100 receives input data sensed by the sensor 601 through the sensor interface 150 of the compute node 100. A compute node 100 which has received input data from the sensor is referred to as a home node $N_H$ 603.

A home node $N_H$ 603 is determined for an input data. For example, when a first compute node receives first input data, the first compute node becomes a home node $N_{H1}$ of the first input data.

One compute node 100 may serve as a home node $N_H$ 603 for a plurality of input data. For example, when the first compute node receives first input data and second input data, the first compute node may serve as a home node $N_{H1}$ of the first input data and a home node $N_{H2}$ of the second input data.

The home node $N_H$ 603 may determine a computational model for the input data, using its own processor 130.

The home node $N_H$ 603 may determine an expected computational load to process a computational model for the input data, using its own processor 130.

In one example, the home node $N_H$ 603 may determine at least one computational model to be executed with respect to input data. In this case, the home node $N_H$ 603 may determine an expected computational load of each computational model.

Subsequently, each compute node 100 in the cluster may share (or transmit) a contributable computational load through the communication interface 110. That is, the home node $N_H$ 603 and the other compute nodes 100 in a cluster interconnected to the home node $N_H$ 603 may transmit a contributable computational load through the communication interface 110. In other words, the home node $N_H$ 603 transmits a contributable computational load to the other compute nodes 100 through the communication interface 110, and the other compute nodes 100 may receive a contributable computational load through the communication interface 110. Accordingly, the home node $N_H$ 603 and the other compute nodes 100 may broadcast the contributable computational load through the communication interface 110.

The home node $N_H$ 603 may determine, using its own processor 130, a master node $N_M$ 605 to distribute the previously determined expected computational load, based on a contributable computational load of the home node $N_H$ and a contributable computational load of the other compute nodes 100. In one example, the home node $N_H$ 603 may determine itself as the master node $N_M$ 605.

The master node $N_M$ 605 may be determined for every computational model with respect to the input data. For example, when the home node $N_H$ 603 is determined to execute two computational models (for example, the computational model A 703 and the computational model B 711 shown in FIG. 7B) with respect to the input data, the home node $N_H$ 603 may determine a master node $N_{MA}$ to distribute an expected computational load of the computational model A and a master node $N_{MB}$ to distribute an expected computational load of the computational model B.

The master node $N_M$ 605 may determine at least one compute node (for example, $N_i$ 607, $N_j$ 609, ..., $N_k$ 611) required to process the expected computational load based on a computational constraint. The master node $N_M$ 605 distributes the expected computational load to at least one previously determined compute node $N_i$ 607, $N_j$ 609, ..., $N_k$ 611, and receives and collects the computing result from the at least one compute node $N_i$ 607, $N_j$ 609, ..., $N_k$ 611.

The master node $N_M$ 605 also performs a part of the expected computational load of the computation, and collects the computing results of the master node $N_M$ 605 together with a computing result received from at least one of compute nodes $N_i$ 607, $N_j$ 609, ..., $N_k$ 611.

Next, the master node $N_M$ 605 transmits the collected computing results to the home node $N_H$ 603.

The home node $N_H$ 603 may output a final result value with respect to the input data based on the received computing result.

In one example, when the plurality of computational models (i.e., the computational models A and B) is executed with respect to the input data, the home node $N_H$ 603 compares the computing results received from the master nodes (for example, $N_{MA}$ and $N_{MB}$) of each computational model, and determines one result value in accordance with the comparison result and outputs the determined result value. For example, the home node $N_H$ 603 may select the best result value, an average value, or a median value. In one example, the home node $N_H$ 603 may output the computing results received from the master nodes $N_{MA}$ and $N_{MB}$ of the computational models.

Figure 7A:
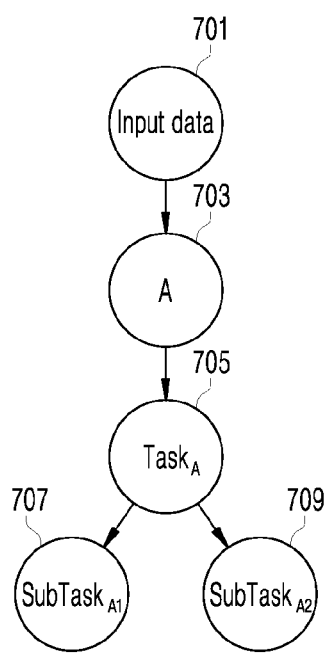
FIG. 7A is a view for explaining a computational model processing process according to an embodiment of the present disclosure.

FIG. 7A is a view for explaining a computational model processing process according to an embodiment of the present disclosure.

Referring back to FIG. 6, the home node $N_H$ 603 receives the input data from the sensor 601 through the sensor interface 150.

The home node $N_H$ 603 determines a computational model to be executed with respect to the input data. For example, it is assumed that the home node $N_H$ 603 determines the computational model A with respect to the input data.

The home node $N_H$ 603 determines an expected computational load for processing the computational model A 703.

The home node $N_H$ 603 and the other compute nodes belonging to the cluster broadcast a contributable computational load with respect to the computational model A 703.

The home node $N_H$ 603 determines a master node $N_{MA}$ for the computational model A 703.

The master node $N_{MA}$ generates a task $Task_A$ 705 with respect to the computational model A 703, and determines at least one compute node to perform the task $Task_A$ 705. For example, it is assumed that the master node $N_{MA}$ determines the first compute node and the second compute node, among the compute nodes of the cluster, as compute nodes to perform the task $Task_A$ 705.

The master node $N_{MA}$ divides the task $Task_A$ 705 with respect to the computational model A 703 into a first sub task $SubTask_{A1}$ 707 and a second sub task $SubTask_{A2}$ 709 based on the contributable computational loads of the first compute node and the second compute node, and allocates the first sub task and the second sub task to the first compute node and the second compute node, respectively.

The first compute node and the second compute node respectively perform the first sub task $SubTask_{A1}$ 707 and the second sub task $SubTask_{A2}$ 709, and report the performance result to the master node $N_{MA}$.

The master node $N_{MA}$ collects the performance result of the first sub task $SubTask_{A1}$ 707 and the performance result of the second sub task $SubTask_{A2}$ 709, and generates a computing result of the task $Task_A$ 705 for the computational model A 703.

The master node $N_{MA}$ reports the computing result of the task $Task_A$ 705 to the home node $N_H$. If necessary, the home node $N_H$ may output the result value.

Those skilled in the art will understand that the number of computational models, the number of tasks, and the number of sub tasks in FIG. 7A are illustrative, and that the present disclosure is not limited thereto.

Figure 7B:
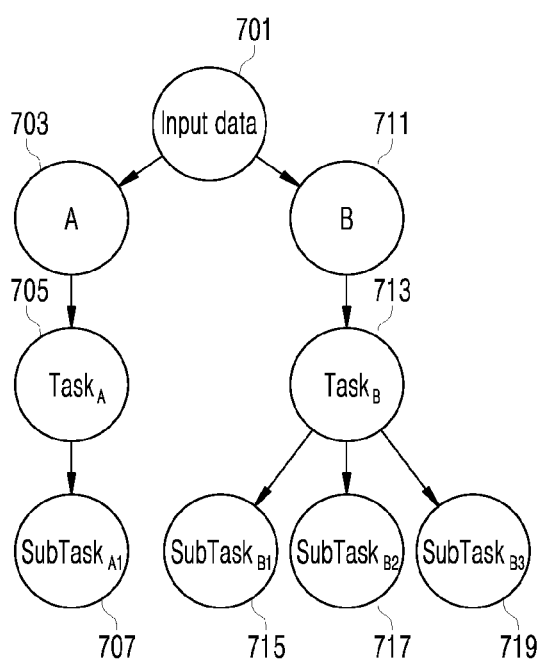
FIG. 7B is a view for explaining a computational model processing process according to an embodiment of the present disclosure.

FIG. 7B is a view for explaining a computational model processing process according to an embodiment of the present disclosure.

Referring to FIG. 7B, as an example, a plurality of computational models for input data is provided.

Referring back to FIG. 6, the home node $N_H$ 603 receives the input data from the sensor 601 through the sensor interface 150.

The home node $N_H$ 603 determines a computational model to be executed with respect to the input data. For example, it is assumed that the home node $N_H$ 603 determines the computational model A 703 and the computational model B 711 with respect to the input data.

The process of generating a task $Task_A$ 707 with respect to the computational model A 703 and dividing the task into sub tasks as described above with reference to FIG. 7A is performed for the computational model A 703 and the computational model B 711 in the example of FIG. 7B. That is, the cluster may sequentially, simultaneously, or alternately perform a series of processes of generating a task $Task_A$ for the computational model A and dividing the task into sub tasks (a process below the computational model A 703 of FIG. 7B), and another series of processes of generating a task $Task_B$ 713 for the computational model B 711 and dividing the task into sub tasks (a process below the computational model B of FIG. 7B).

In an example illustrated in FIG. 7B, the home node $N_H$ may determine a master node $N_{MA}$ for the computational model A 703 in accordance with the process described with reference to FIG. 7A. The master node $N_{MA}$ generates a task Task$_A$ 705 for the computational model A 703 and allocates a sub task SubTask$_{A1}$ 709 to a compute node 100 in the cluster.

Similarly, the home node N$_H$ determines a master node N$_{MB}$ for the computational model B 711 in accordance with the process described above with reference to FIG. 7A. The master node N$_{MN}$ generates a task Task$_B$ 713 for the computational model B 711, divides the task Task$_B$ 713 into sub tasks SubTask$_{B1}$ 715, SubTask$_{B2}$ 717, and SubTask$_{B3}$ 719, and allocates the sub tasks to compute nodes 100 in the cluster.

When the computation is completed, the master node N$_{MA}$ collects the computing results for the task Task$_A$ 705 for the computational model A 703, and reports the computing result to the home node N$_H$. The master node N$_{MB}$ collects the computing results for the task Task$_B$ 713 for the computational model B 711, and reports the computing result to the home node N$_H$.

The home node N$_H$ may determine a final result value based on the computing result of the task Task$_A$ 705 for the computational model A 703 and the computing result of the task Task$_B$ 713 for the computational model B 711.

Those skilled in the art will understand that the number of computational models, the number of tasks, and the number of sub tasks in FIG. 7B are illustrative, and that the present disclosure are not limited thereto.

Hereinafter, a process of a computational model processing method will be described with reference to FIGS. 4 and 5.

Figure 4:
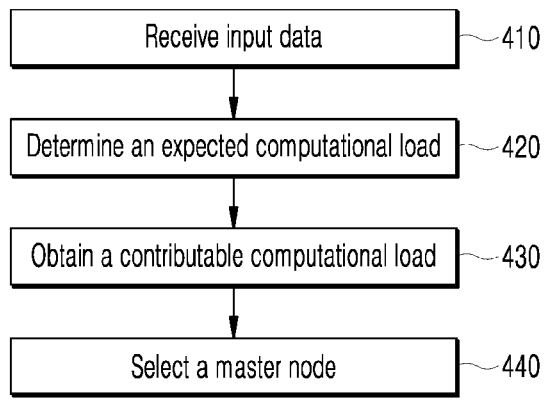
FIG. 4 is a flowchart of a computational model processing method according to an embodiment of the present disclosure.

FIG. 4 is a flowchart of a computational model processing method according to an embodiment of the present disclosure.

A computational model processing method according to an embodiment will be performed by a plurality of compute nodes that configure the cluster. The plurality of compute nodes may be interconnected to each other through the communication interface 110.

The computational model processing method may include a step 410 of receiving input data by a home node N$_H$, which is one of a plurality of compute nodes, a step S420 of determining, by the home node N$_H$, an expected computational load for processing a computational model for the input data, a step S430 of sharing (or transmitting), by the compute nodes N$_a$, a contributable computational load in response to a request of the home node N$_H$, and a step S440 of selecting, by the home node N$_H$, a master node N$_M$ to distribute the expected computational load among the plurality of compute nodes based on the received contributable computational load.

In step 410, the home node N$_H$, which is one of the plurality of compute nodes, receives input data. The home node N$_H$ may receive (or obtain) input data from the sensor through the sensor interface 150. A compute node 100 which receives input data from the sensor may serve as a home node N$_H$ for the input data.

In step 420, the home node N$_H$ may determine an expected computational load for processing a computational model for the input data received in step 410.

Step 420 may include a step of determining at least one computational model for the input data received in step 410. Step 420 of determining an expected computational load, step 430 of sharing the contributable computational load, and step S440 of determining a master node N$_B$, to be described below, may be performed for every computational model of at least one computational model as described above with reference to FIGS. 7A and 7B.

The home node N$_H$ may determine at least one computational model to be used to analyze the input data based on an attribute of the input data. The attribute of the input data may include a type, a size, and a format of the input data.

Step 420 may include a step of calculating a computational amount of the computational model and a step of calculating a bandwidth of the computational model. Here, the computational amount refers to a computational amount which is required to execute a learning/inference algorithm for the input data using the computational model. The bandwidth refers to the number of intermediate data and parameters generated for each layer of the computational model. In step 420, the home node N$_H$ may determine an expected computational load for processing a computational model for the input data based on the computational amount and the bandwidth of the computational model.

In step 430, each compute node N$_a$ of the plurality of compute nodes may transmit the contributable computational load in response to the request of the home node N$_H$.

In step 430, the home node N$_H$ may broadcast, through the communication interface 110, a message requesting the sharing of the contributable computational load of each compute node N$_a$. In this case, the home node N$_H$ may broadcast a computational constraint together with the message or in addition to the message.

In step 430, each compute node N$_a$ of the cluster determines a contributable computational load of each compute node N$_a$ for the expected computational load determined in step 420, and broadcasts the determined contributable computational load through the communication interface 110.

For example, each compute node N$_a$ may determine a contributable computational load of each compute node N$_a$ under the computational constraint. Each compute node N$_a$ may determine a contributable computational load of the expected computational load in consideration of a current computational load, a waiting computational load, a computing ability of each compute node N$_a$, and available resources. For example, when the computational constraint is one minute and an expected computational load is 100, the first compute node N$_1$ may determine a contributable computational load of the first compute node N$_1$ within one minute, which is the computational constraint, as 70, in consideration of the current computational load, a waiting computational load, a computing ability, and available resources.

In step 440, the home node N$_H$ may determine a master node N$_M$ to distribute the expected computational load among the plurality of compute nodes based on the contributable computational load shared in step 430. In one example, the home node N$_H$ may determine a compute node having the largest contributable computational load among the plurality of compute nodes as the master node N$_M$.

Figure 5:
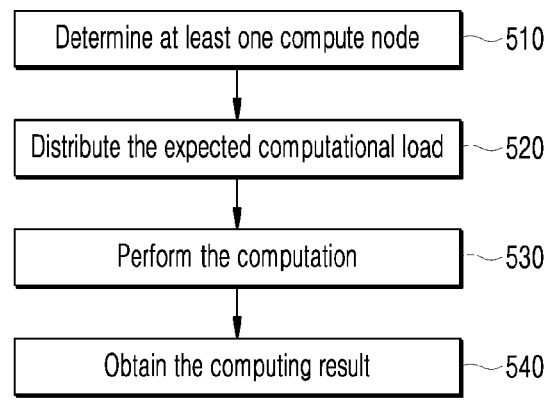
FIG. 5 is a flowchart of a computational model processing method according to an embodiment of the present disclosure.

FIG. 5 is a flowchart of a computational model processing method according to an embodiment of the present disclosure.

The computational model processing method may further include a step of distributing, by the master node N$_M$ determined in step 440, an expected computational load determined in step 420 to at least one compute node based on the contributable computational load shared in step 430.

The step of distributing the expected computational load to at least one compute node among the plurality of compute nodes by the master node N$_M$ may include a step 510 of selecting (or determining) at least one compute node required to process the expected computational load based on the computational constraint, and a step 520 of distributing the expected computational load to at least one compute node selected in step 510.

In step 510, the master node $N_M$ may select at least one compute node required to process the expected computational load based on the computational constraint.

The computational constraint may include a computing restriction time. The computing restriction time refers to a response time for the computing result. The computational constraint may include a limitation regarding the number of compute nodes to process the computational model.

For example, referring to FIG. 4, in step 430, the home node $N_H$ may share the computational constraint with the plurality of compute nodes by broadcasting the computational constraint through the communication interface 110.

In step 510, the master node $N_M$ may select at least one compute node required to process the expected computational load in order to satisfy the computational constraint. During this process, the master node $N_M$ may consider the contributable computational load of each compute node $N_a$ received in step 430 with reference to FIG. 4.

In step 520, the master node $N_M$ may distribute the expected computational load to at least one compute node selected in step 510. For example, the master node $N_M$ may divide the input data for each section and/or for each feature, and distribute the divided input data to at least one compute node selected in step 510. For example, the master node $N_M$ may expand the computational model to be a distributed structure, and distribute the input data to at least one compute node selected in step 510.

Additionally, the computational model processing method may further include a step 530 of performing computation for learning/inference based on the computational model of each of the least one compute node to which the expected computational load was distributed in step 520.

Further, the computational model processing method may further include a step 540 of receiving a computing result from the at least one compute node to which the expected computational load was distributed in step 520, and collecting the received computing result by the master node $N_M$.

The master node $N_M$ transmits the computing results collected in step 540 to the home node $N_H$. The home node $N_H$ receives the computing result from the master node $N_M$.

When the home node $N_H$ has determined at least one computational model for the input data in step 420 with reference to FIG. 4, in step 440, the master node $N_M$ is determined for every computational model. The master node $N_M$ performs steps 510 to 540 of FIG. 5, and the home node $N_H$ receives the computing result of each computational model from the master node $N_M$ of each computational model. The home node $N_H$ compares the computing results of the at least one computational model, and determines and outputs one result value in accordance with the comparison result. For example, the home node $N_H$ may select the best result value, or the home node $N_H$ may output an average value or a median value. In one example, the home node $N_H$ may output all the computing results received from the master nodes $N_M$ of the computational models.

Figure 8:
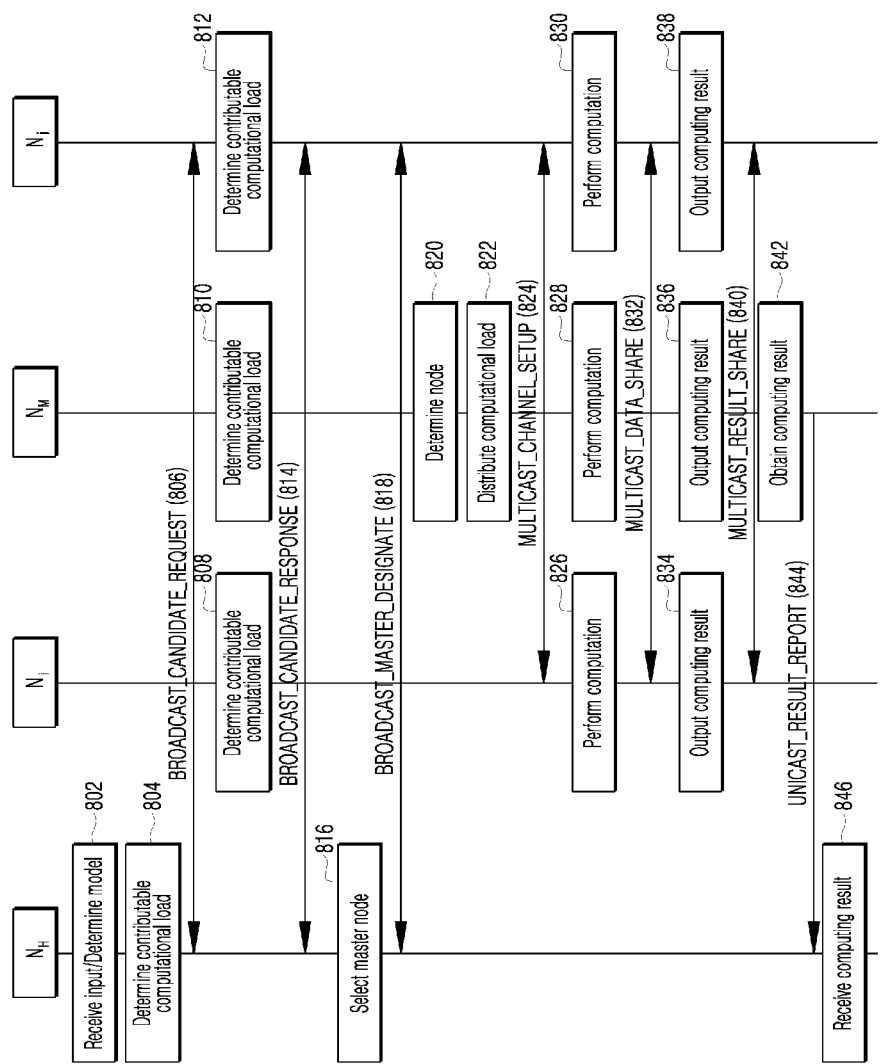
FIG. 8 is a flowchart of a signal of a computational model processing process according to an embodiment of the present disclosure.

FIG. 8 is a flowchart of a signal of a computational model processing process according to an embodiment of the present disclosure.

In step 802, the home node $N_H$ receives the input data through the sensor interface 150. The home node determines a computational model for the input data. Among the plurality of nodes included in the cluster, the node which receives the input data performs the function of a home node $N_H$ for the input data.

In step 804, the home node $N_H$ determines an expected computational load required in order to execute the computational model for the input data and determines a computational load contributable by the home node $N_H$ in executing the computational model.

In step 806, the home node $N_H$ generates task information for executing the computational model. For example, the task information may include a task ID, input data information, computational model information, and a computational constraint. The home node $N_H$ broadcasts, through the communication interface 110, a message BROADCAST_CANDIDATE_REQUEST including task information.

Each compute node 100 in the cluster which receives the message BROADCAST_CANDIDATE_REQUEST in steps 808, 810, and 812 checks the task information, and determines the contributable computational load.

In step 814, each compute node 100 broadcasts, through the communication interface 110, a message BROADCAST_ CANDIDATE_RESPONSE including the task ID, the compute node ID, and the contributable computational load.

In step 816, the home node $N_H$ which receives the message BROADCAST_CANDIDATE_RESPONSE determines (or selects) the master node $N_M$ based on the contributable computational load of each compute node 100.

In step 818, the home node $N_H$ broadcasts, through the communication interface 110, a message BROADCAST_MASTER_DESIGNATE including the task ID and the ID of the master node determined in step 816.

Steps 802 to 818 are a series of steps for determining, by the home node $N_H$, a master node $N_M$ to execute the computational model, and operations performed in steps 410 to 440, described above with reference to FIG. 4, are illustrated together with the flow of the messages.

Steps 820 to 840, to be described below, are a series of steps for computing the computational model, and the operations performed in steps 510 to 540, described above with reference to FIG. 5, are illustrated together with the flow of the messages.

In step 820, the master node $N_M$ selects at least one compute node to perform a computation of the computational model.

In step 822, the master node $N_M$ distributes an expected computational load to the at least one compute node selected in step 820.

In step 824, the master node $N_M$ establishes a multicast channel for communication between the at least one compute node selected in step 820. The multicast channel is provided through the communication interface 110.

A message MULTICAST_CHANNEL_SETUP may include the task ID and multicast channel information. The multicast channel information may include a multicast channel ID and at least one compute node ID connected through the multicast channel.

In steps 826, 828, and 830, each compute node 100 of the at least one compute node connected through the multicast channel may perform the contributable computational load for the computational model.

In step 832, the at least one compute node connected through the multicast channel may share (or distribute), through the multicast channel, accompanying intermediate data during the computation of the computational model in steps 826, 828, and 830. To this end, a message MULTICAST_DATA_SHARE may include a multicast channel ID and intermediate data.

The at least one compute node connected through the multicast channel in steps 834, 836, and 838 deduces the computing result, and shares the computing result in step 840 through the multicast channel. A message MULTICAST_RESULT_SHARE may include a multicast channel ID, a compute node ID, and the computing result.

In step 842, the master node $N_M$ collects (or obtains) the results shared in step 840.

In step 844, the master node $N_M$ transmits the collected computing results to the home node $N_H$. A message UNICAST_RESULT_REPORT includes the task ID and the collected computing result.

In step 846, the home node $N_H$ receives the collected computing result.

FIG. 9 is a table exemplarily illustrating a message structure of a computational model processing process according to an embodiment of the present disclosure.

A table 910 illustrated in FIG. 9 illustrates an exemplary message used during the computational model processing process.

The message BROADCAST_CANDIDATE_REQUEST is broadcasted from the home node $N_H$ to all compute nodes 100 in the cluster in step 806, referring to FIG. 8. The message BROADCAST_CANDIDATE_REQUEST may include the above-described task information.

The message BROADCAST_CANDIDATE_RESPONSE is the message which is broadcasted by each compute node 100 in step 814, with reference to FIG. 8. The message BROADCAST_CANDIDATE_RESPONSE may include a task ID, a compute node ID, and a contributable computational load of each compute node.

The message BROADCAST_MASTER_DESIGNATE is broadcasted from the home node $N_H$ to all compute nodes 100 in the cluster in step 818, referring to FIG. 8. The message BROADCAST_MASTER_DESIGNATE may include a task ID and a master node ID.

Referring to FIG. 8, the message MULTICAST_CHANNEL_SETUP of step 824, the message MULTICAST_DATA_SHARE of step 832, and the message MULTICAST_RESULT_SHARE of step 840 are messages which are multi-casted on the multicast channel for at least one compute node selected to compute the computational model.

The message UNICAST_RESULT_REPORT is the message transmitted from the master node $N_M$ to the home node $N_H$ in step 844, referring to FIG. 8, and includes the task ID and the computing result.

FIG. 10 is a table exemplarily illustrating a structure of a task table according to an embodiment of the present disclosure.

The task table 1010 is a data structure for storing task information of a task for executing the computational model. The master node $N_M$ generates a process for managing a task (for example, Task$_A$ 705), referring to FIG. 7A or 7B, and manages a task based on information stored in the task table 1010. The master node $N_M$ may manage the task table of tasks which are being performed, as a task list.

The task table 1010 may include a task ID for identifying a task, a model ID for identifying a computational model executed by the task, input data information, a computational constraint, a multicast channel ID for identifying a multicast channel for at least one compute node selected to perform the task, and a node list including information about the at least one compute node selected to perform the task.

The method of processing a computational model in parallel according to an embodiment described above may provide dynamic scheduling of multiple models.

The dynamic scheduling of multiple models refers to a task of determining at least one compute node, among a plurality of compute nodes included in a cluster, to perform a computational load for a computation of a computational model, and distributing the computational load of each computational model among the at least one determined compute node, in order to analyze input data (i.e., images or audio) using multiple models (at least one computational model) under a computational constraint (i.e., learning/inference restriction time).

According to the embodiments of the present disclosure, the computational models which can be executed by each compute node are not fixed, but a compute node to execute the multiple models and a computational load for each compute node in order to execute the multiple models are dynamically determined in accordance with an attribute of the acquired input data, a current state (i.e., current/waiting computational load) of each node, and a computational constraint. Accordingly, dynamic scheduling is enabled.

The compute node, the cluster including a plurality of compute nodes, and the computational model processing method by the plurality of compute nodes according to the embodiments of the present disclosure can be applied to various products and services, to thereby improve a recognition rate by artificial intelligence.

For example, the cluster according to the embodiments of the present disclosure can be installed in home appliances such as a home robot, a robot cleaner, an air conditioner, a washing machine, and a refrigerator as an artificial intelligence chip, thereby providing artificial intelligence algorithm-based operations.

Further, the computational model processing method according to the embodiments of the present disclosure can simultaneously recognize images and speech, and can thereby implement integration platform-based artificial intelligence functions. For example, the first compute node may receive image data from the vision sensor and the second compute node may receive speech data from a voice sensor, and the computational model for the image data and the speech data can thus be simultaneously computed.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as those produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

In the foregoing, while specific embodiments of the present disclosure have been described for illustrative purposes, the scope or spirit of the present disclosure is not limited thereto, it will be understood by those skilled in the art that various changes and modifications may be made to other specific embodiments without departing from the spirit and scope of the present disclosure. Therefore, the scope of the present disclosure should be defined not by the above-described embodiments but by the technical idea defined in the following claims.

What is claimed is:

1. A system on chip (SoC) comprising:
a communication interface configured to communicate with one or more other SoCs;
a memory configured to store shared data that is shared with the one or more other SoCs; and
a processor configured to:
determine an expected computational load for processing a computational model for input data;
broadcast a contributable computational load of the SoC;
obtain one or more contributable computational loads which are broadcasted from the one or more other SoCs; and
dynamically select a master node to distribute the determined expected computational load based on the broadcast contributable computational load and the obtained one or more contributable computational loads.

2. The SoC of claim 1, wherein the processor is further configured to obtain the input data from an external sensor via a sensor interface.

3. The SoC of claim 1, wherein determining the expected computational load comprises analyzing the input data based on an attribute of the input data, wherein the attribute may correspond to at least one of a type, a size, or a format.

4. The SoC of claim 1, wherein the master node is selected from among the SoC and the one or more other SoCs.

5. The SoC of claim 1, wherein the selected master node is configured to:
determine at least one SoC for processing the expected computational load based on a computational constraint;
distribute the expected computational load to the at least one SoC; and
obtain a computing result of the at least one SoC, and wherein the processor is further configured to receive the computing result from the master node via the communication interface.

6. The SoC of claim 1, further comprising at least one artificial intelligence (AI) accelerator configured to perform a computation of the computational model.

7. The SoC of claim 6, wherein the AI accelerator is further configured to generate intermediate data when performing the computation and store the intermediate data in the memory.

8. The SoC of claim 7, wherein the processor is further configured to transmit the generated intermediate data to the one or more other SoCs via the communication interface.

9. The SoC of claim 1, wherein the shared data includes at least the input data, the contributable computational load, intermediate data acquired by executing the computational model, or a computing result of the computational model.

10. A cluster comprising,
a plurality of systems on chip (SoCs), wherein a SoC from among the plurality of SoCs comprises:
a communication interface configured to communicate with one or more other SoCs from among the plurality of SoCs;
a memory configured to store data that is broadcast to the one or more other SoCs; and
a processor configured to:
determine an expected computational load for processing a computational model for input data;
broadcast a contributable computational load of the SoC:
obtain one or more contributable computational loads which are broadcasted from the one or more other SoCs; and
dynamically select a master node to distribute the determined expected computational load based on the broadcast contributable computational load and the obtained one or more contributable computational loads.

11. The cluster of claim 10, wherein the plurality of SoCs are disposed on a single board symmetrically.

12. The cluster of claim 10, wherein one SoC of the plurality of SoCs is disposed on a main board, and each of a remaining SoCs of the plurality of are SoCs is respectively disposed on a sub board of a plurality of sub boards and mounted in a slot of the main board.

13. A method for processing an artificial intelligence model by a plurality of Systems on Chip (SoCs), the method comprising:
receiving input data by a home SoC, wherein the home SoC is one of the plurality of SoCs;
determining, by the home SoC, an expected computational load for processing a computational model for the input data;
transmitting, by each SoC, a contributable computational load in response to a request of the home SoC; and
dynamically selecting, by the home SoC, a master SoC configured to distribute the determined expected computational load among the plurality of SoCs based on the transmitted contributable computational load.

14. The method of claim 13, wherein the determining of the expected computational load comprises:
determining a computational amount of the computational model; and
determining a bandwidth of the computational model.

15. The method of claim 13, wherein the plurality of SoCs are interconnected to each other via a communication interface, and
wherein transmitting the contributable computational load comprises broadcasting, by each SoC, the transmitted contributable computational load via the communication interface.

16. The method of claim 13, further comprising distributing, by the master SoC, the determined expected computational load to at least one SoC among the plurality of SoCs based on the transmitted contributable computational load.

17. The method of claim 16, wherein the distributing the determined expected computational load comprises:
   selecting at least one SoC for processing the determined expected computational load based on a computational constraint; and
   distributing the expected computational load to the at least one SoC.

18. The method of claim 16, further comprising:
   obtaining, by the master SoC, a computing result from the at least one SoC; and
   transmitting, by the master SoC, the obtained computing result to the home SoC.

19. The method of claim 13, further comprising determining, by the home SoC, at least one computational model for the input data,
   wherein the determining of the expected computational load, the transmitting the contributable computational load, and the selecting of the master SoC are performed for each computational model of the at least one computational model.

20. The method of claim 19, further comprising:
   obtaining, by the home SoC, a computing result of each computational model from a master SoC of each computational model; and
   comparing, by the home SoC, at least one obtained computing result.

* * * * *